United States Patent

Thornhill

[11] Patent Number: 5,423,148
[45] Date of Patent: Jun. 13, 1995

[54] REVERSIBLE PLANT CAGE/GREENHOUSE

[76] Inventor: Michael Thornhill, Rte. 2, Box 2231, Clatskanie, Oreg. 97106

[21] Appl. No.: 310,979

[22] Filed: Sep. 23, 1994

Related U.S. Application Data

[62] Division of Ser. No. 998,404, Dec. 29, 1992.

[51] Int. Cl.⁶ .................... A01B 79/00; A01C 1/00
[52] U.S. Cl. .................... 47/58.1; 47/26; 47/21
[58] Field of Search ............ 47/21 A, 26, 45 R, 45 C, 47/32.1 R, 58.1

[56] References Cited

U.S. PATENT DOCUMENTS

| | | |
|---|---|---|
| 915,146 | 3/1909 | Woerner ............ 47/45 C |
| 1,025,073 | 4/1912 | Ragan . |
| 1,432,403 | 10/1922 | McQuaid ............ 47/45 C |
| 1,600,969 | 9/1926 | Beers ............ 206/423 |
| 1,641,244 | 9/1927 | Woodruff . |
| 2,009,687 | 7/1935 | Ball . |
| 2,014,175 | 9/1935 | Hart . |
| 2,109,426 | 2/1938 | King . |
| 2,141,484 | 12/1938 | Piglia ............ 47/26 |
| 2,181,016 | 11/1939 | Gross . |
| 3,264,783 | 8/1966 | Bayliss . |
| 3,481,075 | 12/1969 | Dastoli et al. ............ 206/423 |
| 3,803,759 | 4/1974 | Heinecke ............ 47/45 C |
| 4,019,280 | 4/1977 | Summers . |
| 4,858,380 | 8/1989 | Gayle . |
| 4,894,951 | 1/1990 | Risley . |

FOREIGN PATENT DOCUMENTS

| | | | |
|---|---|---|---|
| 2437159 | 5/1980 | France ............ 47/47 L |
| 3628634 | 10/1987 | Germany ............ 47/47 |
| 3809098 | 9/1989 | Germany ............ 47/47 |
| 134373 | 5/1948 | Hungary ............ 47/26 |
| 1409160 | 7/1988 | U.S.S.R. ............ 47/21 A |
| 1442109 | 12/1988 | U.S.S.R. ............ 47/45 C |

*Primary Examiner*—Michael Powell Buiz
*Assistant Examiner*—Joanne C. Downs
*Attorney, Agent, or Firm*—Marger, Johnson, McCollom & Stolowitz

[57] ABSTRACT

A dual purpose plant cage/greenhouse in an upright greenhouse configuration provides a stable structure that is resistant to being blown over and effectively protects a plant from harsh environmental conditions. In an inverted plant cage configuration, the structure provides an effective structure for supporting the branches of plants. In addition, the top set of legs in the plant cage configuration serve the dual purpose of attaching to other plant cages to provide a highly stable multi-cage inter-structure. The plant cage/greenhouse is easily manufactured and is stackable for low cost shipping.

6 Claims, 6 Drawing Sheets

REVERSIBLE PLANT CAGE/GREENHOUSE

This is a division of application Ser. No. 07/998,404, filed Dec. 29, 1992.

BACKGROUND OF THE INVENTION

This invention relates generally to portable greenhouses, and cages for supporting plant branches and more particularly to an inexpensive multi-purpose structure that operates as a portable greenhouse in a first configuration and is convertable to a second configuration to operate as a plant cage.

Many different types of apparatus are used to help plants through their different stages of development. To protect plants from dying in their initial growing stage, they must be protected from harsh environmental conditions. For example, in the winter, it is often necessary to cover the plant or grow the plant inside a greenhouse to protect it from frost and cold winds. However, as the plant continues to grow and the weather becomes more temperate, the plant protection is no longer required. It is then necessary to support the branches or vines of the plant above the ground. This increases the exposure of the plant foliage to sun and rain, and also keeps the vines away from slugs and other infestations.

To prevent having to buy and install two different structures, it would be advantageous to use the same structure for both a greenhouse and a cage for hanging plant branches. Most structures, however, can not perform both functions. In addition, the most effective structure for a greenhouse is not necessarily the most effective structure for supporting plant branches. For example, a greenhouse should be designed so that it effectively protects the plant from harsh environmental conditions. It should also be sturdy enough not to be blown over or destroyed by wind and other conditions. On the other hand, a plant cage should be dimensioned to allow maximum exposure of the plant to sun and rain while maintaining a high degree of stability. In addition, the decision made by a gardener whether to plant, and the decision on what types of vegetables to plant, change from year to year. Thus, a gardener may need different sized greenhouses and plant supports each year. Alternatively, a greenhouse and plant support may only be needed for a single growing season. The structure, therefore, should be inexpensive enough to be disposed of after a single use.

U.S. Pat. No. 1,025,073 to Ragan illustrates a cone shaped wire structure for protecting a plant from sun and frost. The structure, however, can not be used as a plant cage, since there is insufficient space at the top of the cage to allow for additional plant growth. In addition, the circular members of the cage slope downward. This would cause the branches of a plant to slide down on top of each other preventing maximum exposure of the plants foliage to sun and rain.

U.S. Pat. No. 2,009,867 to Ball illustrates a trellis that can also be covered with a netting to provide protection of the plant from insects. The netting can then be removed from the trellis to provide support for hanging plant branches. The design of the structure, however, prevents it from being effective as both a greenhouse and plant support. For example, the wire structure maintains the same diameter throughout and has a separate top cover. The flat top makes the cage more susceptible to collapsing from the weight of snow and to being tipped over from animals that may try to perch on top of the structure.

Since the bottom of the cage is the same diameter as the top, it is more likely to be blown over by the wind. If the trellis in Ball were to effectively function as a greenhouse, it must be covered with some insulative material other than netting. The covering, however, increases the structure's wind resistance. Since the overall surface area in the Ball structure is greater than the surface area of a conical structure of the same height, the Ball structure is more likely to be blown over. Thus, the legs of the structure in Ball must be longer for deeper insertion into the ground and the cage must be made out of a heavier gauge wire to provide more support.

The trellis in Ball also does not provide the most effective support for hanging plant branches. Since the cage is the same diameter throughout, it is more difficult for the smaller branches at the bottom of the plant to reach the bottom rings of the structure. In addition, the structure doesn't expand outward from the base. This restricts outward plant growth, preventing maximum exposure of the plant to sun and rain. The trellis also comprises two separate pieces, (i.e., the cage and the cover). Separate components increase the cost of manufacture and increase the chances of losing a piece when not in use.

In a garden where multiple plant cages are used, the strength of each cage is increased by wiring the cages together. If the means for connecting each cage together was an integral part of the cage itself, it would eliminate the chance of losing parts and increase the cohesive strength of the overall structure. However, if the cages are placed too close to each other, the branches and roots of each plant will intertwine, preventing either plant from growing to its maximum potential. Thus, placing the cylindrical plant cage of Ball next to another similar cage could put their associated plants too close together. Since multiple plant cages are typically used in a garden, a significant amount of space is required for storage. Therefore, a superior plant cage/greenhouse structure would also be capable of being stacked.

Accordingly, a need exists for a low cost dual purpose greenhouse/plant cage that provides maximum support and the best possible growing environment for a plant.

SUMMARY OF THE INVENTION

It is, therefore, an object of the invention to increase the utility of a unitary structure in operating as both a greenhouse for protecting a plant from harsh environmental conditions and as a support for holding the branches of the plant above the ground in a fashion that maximizes the plants growth capacity.

Another object of the invention is to minimize the cost to manufacture and ship and to minimize the amount of space needed to store a dual purpose plant cage/greenhouse.

A further object of the invention is to develop a dual purpose plant cage/greenhouse that provides increased stability in supporting plants when operating as a plant cage while providing a high resilience to environmental conditions when operating as a greenhouse.

The invention comprises a reversible plant cage/greenhouse structure having a wire cage elongated about a vertical center axis. The structure operates as a greenhouse in an upright position and as a plant cage in an inverted position. The structure in the upright position, has a first set of bendable legs coupled about its top that are bent up and toward the center axis of the cage to provide a top enclosure. A second set of bendable legs are coupled about the bottom of the cage, and are bent vertically downward for insertion into the ground to hold the cage upright. A removable heatshrink plastic cover extends over the first set of legs and the cage so that the cover, legs, and cage function as a greenhouse.

The wire cage comprises multiple circular rings concentrically aligned about the center axis and are coupled together with a set of wire members. Each wire member extends above and below the cage to operate as one leg from the first and second set of legs respectively. Each cage ring, starting from the top of the cage, has a larger diameter than the ring it is immediately above. Thus, providing a cone shaped greenhouse that maximizes plant protection and allows multiple cages to be stacked together.

To change the greenhouse to a structure for supporting plants, portions of the plastic cover are removed. This allows branches of the plant to extend out of the cage. The cage is then inverted and the first set of legs are bent vertically downward. The first set of legs are then inserted into the ground to hold the cage upright. The second set of legs are bent away from the center axis and downward allowing the plant to grow out through the top of the cage. In the inverted position, each ring in the cage, starting from the top, is smaller than the ring immediately above it. Thus, the cage widens at the top, providing a structure that maximizes the exposure of the plant to sun and rain. Portions of the cage, where the plastic cover still remains intact, provide plant protection and control plant growth by preventing branches of the plant from protruding out or the structure.

To increase stability, the second set of legs are used to couple the cage to a support member or to a second cage. Multiple cages coupled together provide a cage inter-structure that has more stability than a single cage and further controls the growing path of multiple plants. Each cage is also capable of being severed at various locations to provide customized support for different types of plants.

In an alternative embodiment, the invention has a detachable upper cover and a base portion. The upper cover is attached to the base portion when the structure operates as a greenhouse. When the upper cover is detached, the base can be used to hang plant branches. The structure reverts back to a greenhouse by simply reattaching the cover to the base. The upper cover is, therefore, reusable year after year without having to remove its plastic cover.

The foregoing and other objects, features and advantages of the invention will become more readily apparent from the following detailed description of a preferred embodiment of the invention which proceeds with reference to the accompanying drawings.

DETAILED DESCRIPTION

Figures 1, 2, 4, 5:
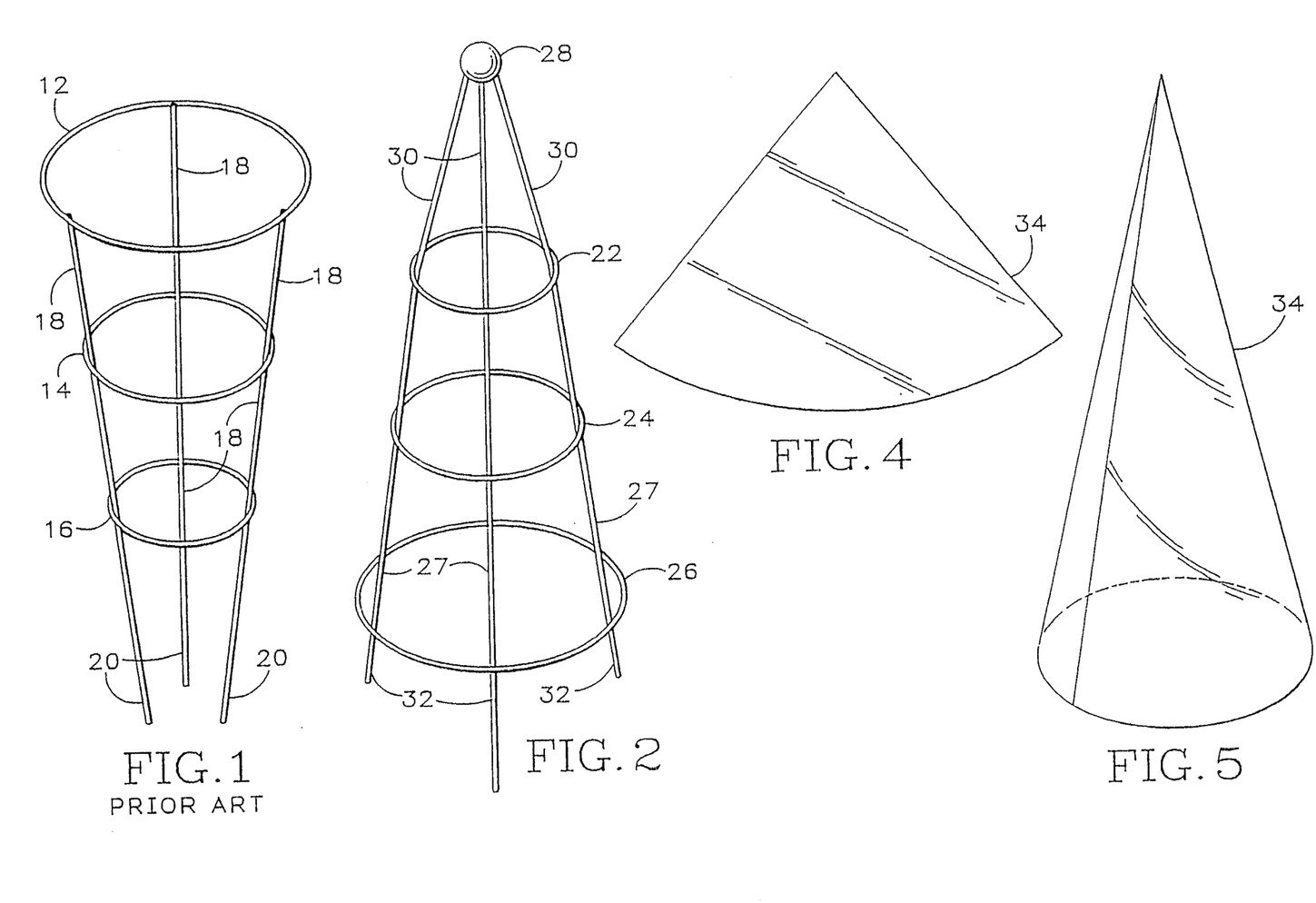
FIG. 1 is prior art illustrating a wire cage for supporting plants.
FIG. 2 shows a wire structure for a reversible plant cage/greenhouse according to a first embodiment of the invention.
FIG. 4 shows the layout of a plastic heatshrink used for covering the wire structure illustrated in FIGS. 2 and 3.
FIG. 5 shows the plastic heatshrink of FIG. 4 fitted together before being placed over the wire structure illustrated in FIG. 2.

FIG. 1 illustrates a prior art wire structure used to support the branches of a plant above the ground. Three wire rings 12, 14, and 16 are coupled to three wire members 18. The wire members extend downward to comprise legs 20 for inserting into the ground. Starting from the top of the wire structure, each ring is successively smaller than the one immediately above it. This creates an upwardly expanding structure that allows a plant to spread out as it grows upward. This exposes the plant's foliage to optimal amounts of sun and rain. The smaller ring 16 at the bottom of the structure supports smaller branches of the plant to be hung above the ground.

FIG. 2 illustrates a three-ring embodiment of the present invention in an upright position. Three parallel rings 22, 24, and 26 are positioned horizontally about a center axis. Each ring, starting from the top ring 22, to middle ring 24, and bottom ring 26, increases in diameter. The rings are coupled together by a set of wire members 27. Each wire member is spaced equally from the other wire members and is coupled to the inside of each ring. The wire members and the rings together form a cage. The wire members 27 extend above the top ring 22 providing a first set of legs 30, and extend below the bottom ring 26 providing a second set of legs 32. The first set of legs come together at the center axis of the cage and are coupled together with a connecting member 28.

Figure 3:
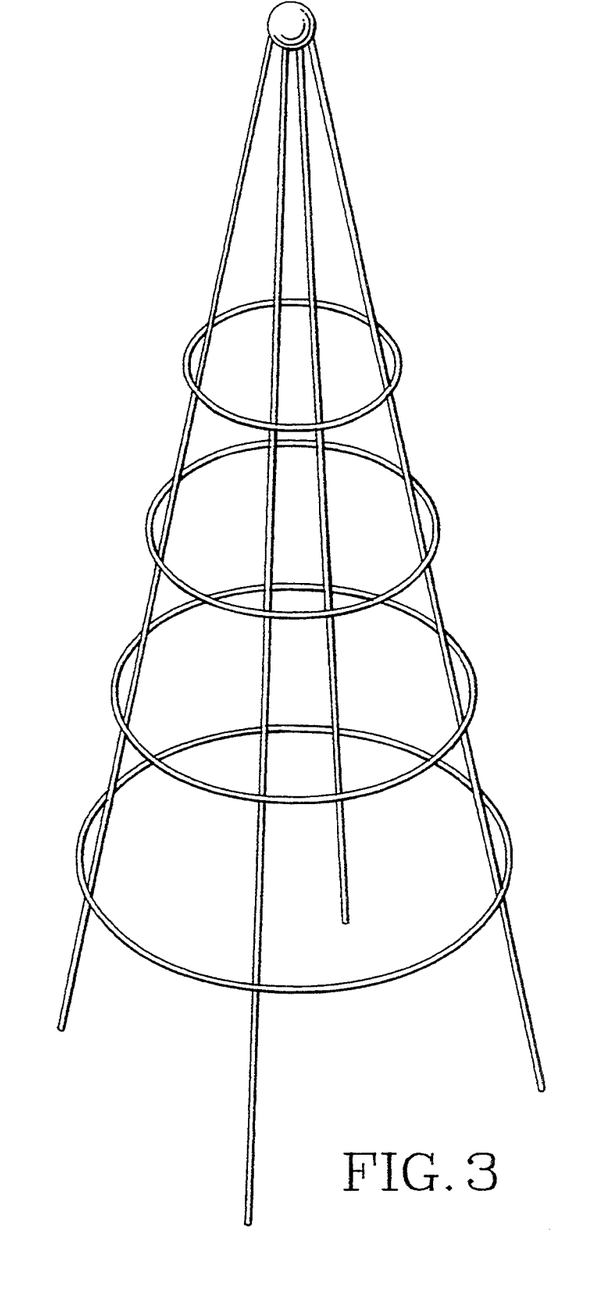
FIG. 3 shows a wire structure for a reversible plant cage/greenhouse according to a second embodiment of the invention.

FIG. 3 is an illustration of a second embodiment of the invention using a fourth ring and an additional wire member. The additional wire member provides an additional top and bottom leg for additional cage support. The additional ring allows the cage to be proportionally larger than the structure illustrated in FIG. 3. Therefore, larger plants can be supported and protected with the same effectiveness as the structure illustrated in FIG. 3. The structures illustrated in FIGS. 2 and 3 could easily be modified for larger or smaller plants by adding or removing rings and wire members.

FIG. 4 is an illustration of a sheet of plastic heatshrink that is used for covering the wire structures illustrated in FIGS. 2 and 3. FIG. 5 shows the sheet of heatshrink illustrated in FIG. 4 after being sealed together. The conical shape of the cage allows the cover to be constructed from a single plastic sheet. The cover is typically made out of a light diffusing plastic but is alternatively made from sturdier materials for increased insulation from the environment and for extended use. Optionally, the plastic can be perforated so that sections of the cover can be easily removed as explained below.

Figure 6:
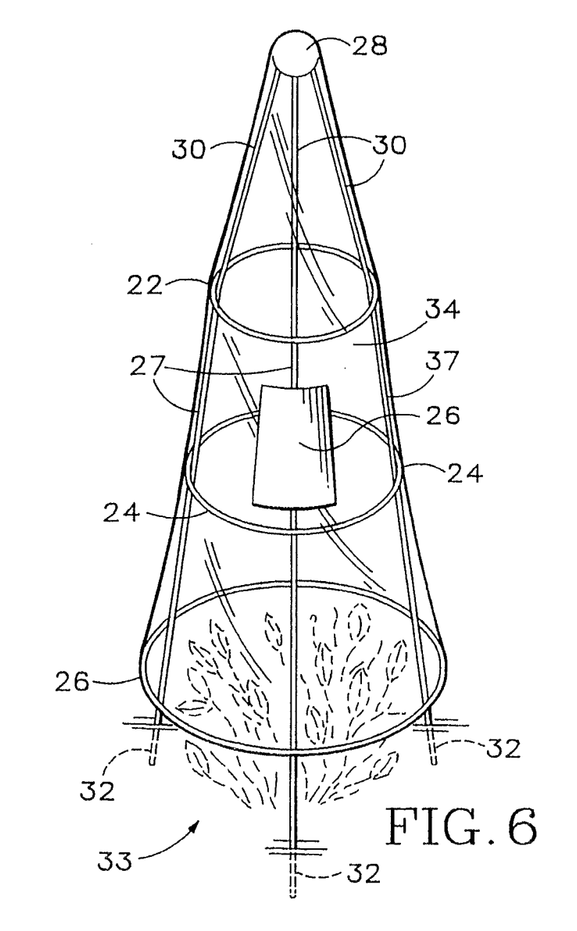
FIG. 6 shows the wire structure of FIG. 2 configured for operation as a greenhouse.

FIG. 6 shows the wire structure illustrated in FIG. 2 covered with the plastic heatshrink illustrated in FIG. 5. The legs 32 of the cage are inserted into the ground covering a plant 33. The depth in which legs 32 are inserted into the ground can be altered to increase or decrease the amount of insulation the greenhouse provides to plant 33. Alternatively, legs 32 are inserted further into the ground to increase its stability in holding up the wire structure. The plastic cover 34, when in its original state as illustrated in FIG. 5, has an internal cavity slightly larger than the outside diameter of the cage. Thus, during manufacture, the plastic is simply wrapped and sealed around the cage illustrated in FIG. 2. The plastic is then heated. This causes the plastic to contract, sealing it around the upper set of legs 30, and the wire cage (i.e., rings 22, 24, and 26, and connecting members. 27).

In the greenhouse configuration shown in FIG. 6, the base of the cage (ring 32) is wide and the top of the cage (ring 22) is narrow. This provides a structure that is less likely than other greenhouses to be blown over by the wind. The insulative covering required by a greenhouse increases wind resistance. Therefore, a large cage with more surface area (e.g., more wind resistance) is more likely to get blown over by high winds. However, the wide base of the greenhouse in FIG. 6 increases the stability of the structure while the narrowing upper portion reduces wind resistance. Therefore, alternative cylindrical or square structures of the same height are more likely to be blown over. The conical shape, as opposed to a greenhouse with a flat top, prevents snow or leaves from accumulating on the top of the structure. The conical shape, also prevents animals from perching on the structure. This reduces the chance of the green house being tipped over.

A styrofoam ball used as connecting member 28 holds the upper legs 30 together and also provides a rounded top that plastic heatshrink 34 cover wraps around. Alternatively, a paper or styrofoam cup could be used for connecting the upper legs together. A sheet of operating instructions 36 can also be wedged between one of the wire members 27 and the plastic heat shrink (see FIG. 3).

Figure 7:
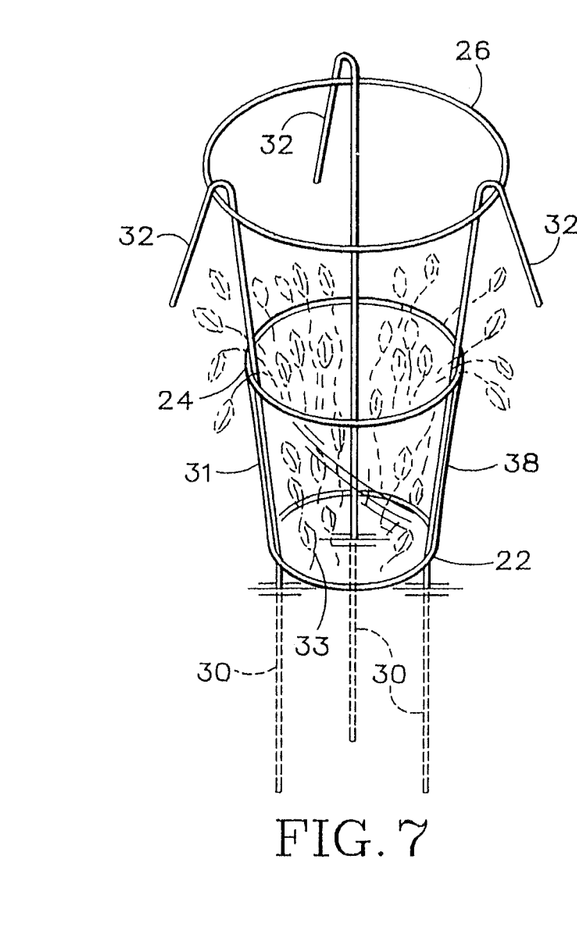
FIG. 7 shows the wire structure of FIG. 2 configured for operation as a plant cage.

FIG. 7 shows the structure of FIG. 6 in an inverted position configured as a plant cage. Portions of the plastic cover that are not to remain attached to the structure are torn off. For example, the plastic section covering the legs 30 and the section of plastic between rings 24 and 26 are removed. As mentioned above, perforations in the plastic can be aligned close to each ring to provide easy remove of the plastic cover section by section. Optionally, all the plastic can be removed from the wire frame. With an alternative type of cover (e.g., vinyl), the cover can be placed over the wire structure and secured with a draw string. The cover is then be removed by simply loosening the drawstring and can be stored for future use.

To complete the plant cage configuration, styrofoam ball 28 is removed and the legs 30 are straighten out. The structure is then inverted and legs 30 are inserted into the ground about the plant. Legs 32 are then bent downward away from the center axis of the cage. If the cage is not going to be reused or is only going to be used in the future as a plant cage, the legs 32 can be cut off with a pair of wire cutters. A plastic section 31 remains attached to the wire frame. This provides additional protection for the plant during its initial stages of growth. The plastic section 31 also serves to control the growth direction of the plant's branches. In the inverted position, the upwardly expanding rings provide a plant cage that allows the plant to expand. Thus, the plant cage provides the most productive environment for plant growth.

Figure 8:
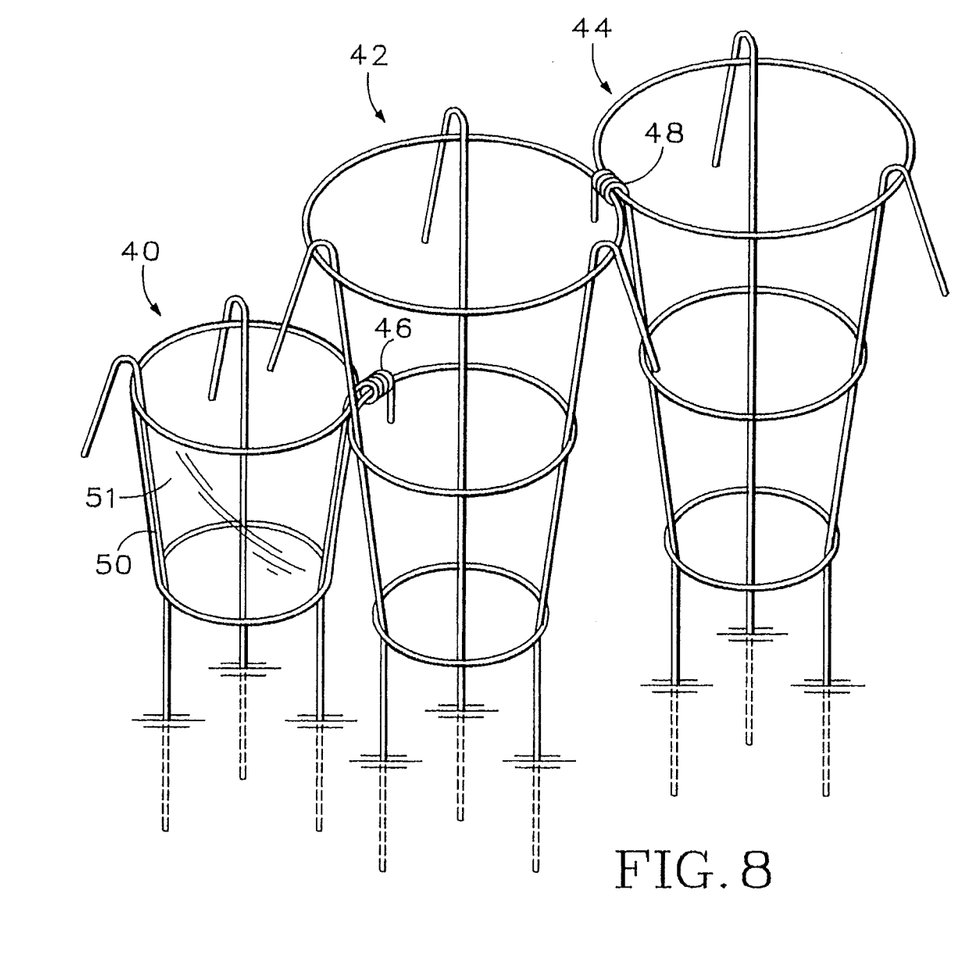
FIG. 8 shows a perspective view of multiple plant cage/greenhouses wired together.

FIG. 8 shows several plant cages wired together. A first cage 40 is coupled by a leg 46 to cage 42, and a cage 44 is wired to cage 42 by a leg 48. Cage 40 has been cut lower than cages 42 and 44 to support a smaller sized plant. Cage 40 remains wrapped with a portion of plastic 51 while the plastic covers of cages 42 and 44 have been entirely removed. By wiring the plant cages together, the three cage inter-structure is sturdier than a single cage. Using the legs as connectors, bond the cages together more securely than using a loose piece of wire and also reduce the cost of manufacturing or purchasing an additional connecting device. To further increase the cohesiveness of the structure, an upper leg of cage 42 can be wrapped around the upper ring of cage 44.

Figure 9:
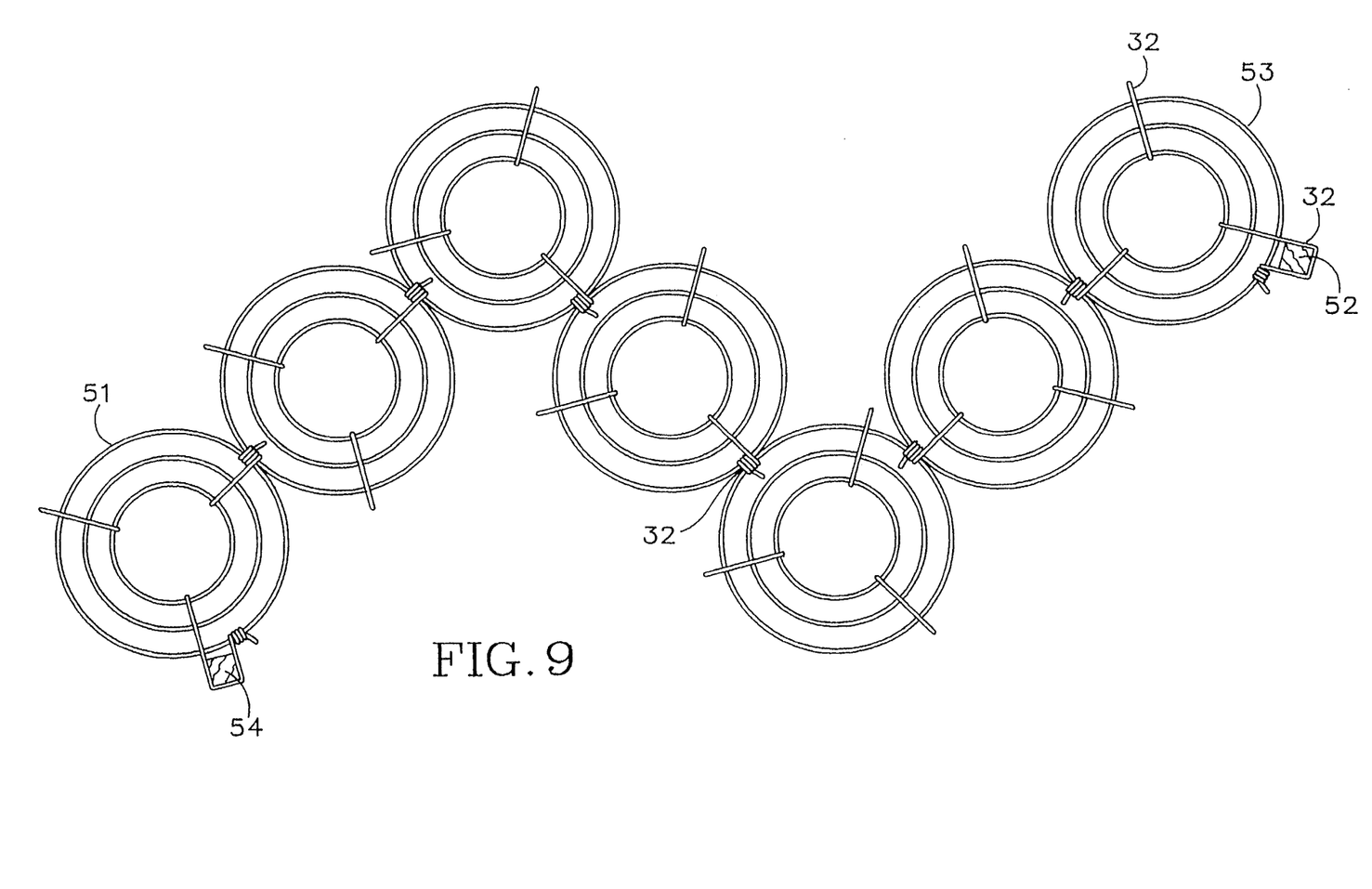
FIG. 9 shows a top view of multiple plant cages wired together.

It is important to note that if the plant cages were previously used as greenhouses, the plants will be properly spaced so that their associated plant cages can be wired together. For example, FIG. 9 is a top view showing multiple cages wired together. The plants associated with each cage are planted so that their greenhouses could be placed side-by-side. Therefore, inverting the structures for use as a plant cages allow the cages to be coupled to each other in the configuration shown in FIG. 9.

Figure 10:
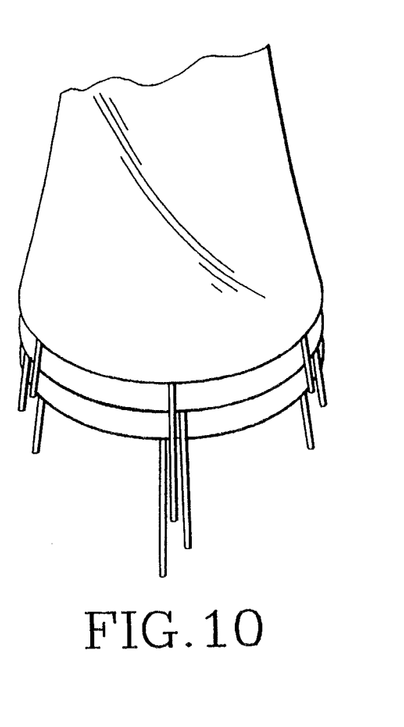
FIG. 10 shows multiple plant cage/greenhouses stacked together.

The circular structure of each cage also increases the flexibility in attaching the cages together at any angle. This allows the cages to be easily adaptable to any garden configuration. In addition, coupling the larger diameter top rings of each cage together, provide sufficient space between the lower sections of each cage to minimize the entangling of branches between different plants. Posts 52 and 54 are optionally inserted into the ground. One of the upper legs 32 from a cage 53 and 51 are wrapped around posts 52 and 54, respectively, to increase the stability of the cage inter-structure. FIG. 10 shows multiple plant cage/greenhouses stacked together. The capacity to stack, reduces the cost of shipping and reduces the space required for a gardener to store multiple cages.

Figure 11:
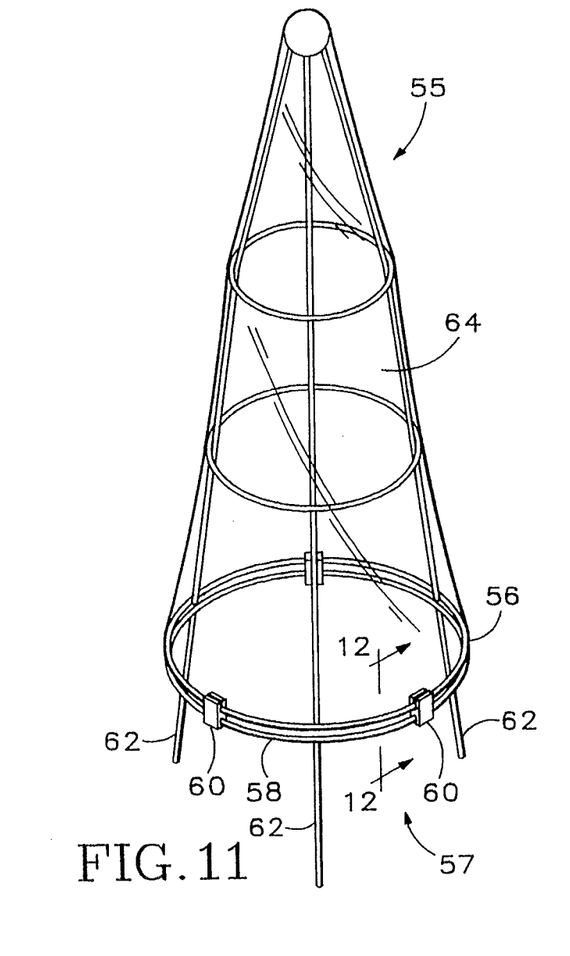
FIG. 11 shows a detachable plant cage/greenhouse according to a third embodiment of the invention.
Figure 12:
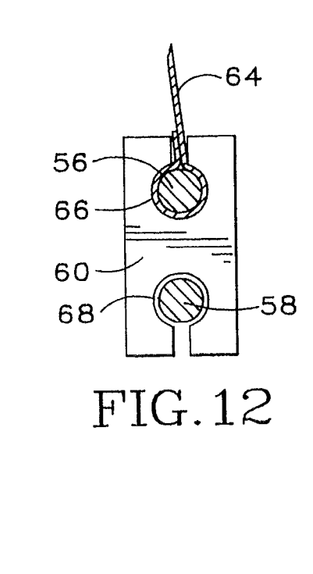
FIG. 12 shows a clip used to attach an upper cover to a base portion of the detachable plant cage/greenhouse illustrated in FIG. 11.

FIG. 11 illustrates a second embodiment of the invention. An upper cover 55 has a structure similar to that illustrated in FIG. 6 except does not have the bottom legs 32 (see FIG. 6). The upper cover 55 is covered with a heat shrink plastic 64 or alternative heavier material for extended use. The base portion 57 comprises a base ring 58 welded to downward extending legs 62. The legs are of sufficient length and wire gauge for insertion into the ground to support the upper cover 55. The lower ring 56 of cover 55 is coupled to the base ring 58 with a set of plastic connectors 60. Referring to FIG. 12, an upper clip slot 66 of connector 60 receives a section of ring 56 and also serves to hold the plastic sheet 64 over upper cover 55. A lower clip slot 68 of connector 60 receives a portion of base ring 58.

The detachable structure as illustrated in FIG. 11 operates as a greenhouse. The legs 62 are inserted into the ground around a plant so that the upper cover 55 maintains a controlled environment for the plant. To configure the structure as a plant cage, the upper cover 55 is detached from the base portion 57 by removing ring 58 from the clips 60. The upper portion is then stored for further use. By itself, the base portion 57 serves as a support for hanging the branches of plants above the ground. Upper cover 55 can be easily reattached to the base portion 57. For example, in the event of a frost warning, or during the next growing season. The upper cover 55 is reattached to the base portion 57 by inserting ring 58 back into the bottom slot 68 of the connector 60 (see FIG. 12). The entire structure illustrated in FIG. 11 is stackable for easy shipping and storage. When not in use, the upper cover 55 can be stacked with other upper covers.

Thus, the structure system shown provides a dual purpose plant cage/greenhouse. The structure in the upright greenhouse configuration provides a stable structure that is resistant to being blown over and is effective in protecting a plant from harsh environmental conditions. In the inverted plant cage configuration, the structure provides an effective structure for supporting the branches of the plant. In addition, the top set of legs in the plant cage configuration serve a secondary function as a connector for attaching plant cages together. The wire structure is easily manufactured and is stackable for low cost shipping.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for using a wire structure as both a greenhouse and a supporting structure for plants comprising:

providing a wire cage centered about a vertical axis and having a first set of bendable legs extending from the top of the cage, and a second set of bendable legs extending from the bottom of the cage;

providing a cover sized to fit over the cage;

bending the first set of legs toward the vertical axis of the cage for enclosing the top of the cage, inserting the second set of legs into the ground to provide support for the cage;

covering the first set of legs and the cage with the cover so that the cover, legs, and cage operate as a greenhouse; and inverting the cage and inserting the first set of legs into the ground for using the cage as a support for plants.

2. A method according to claim 1 including partially removing portions of the cover for selectively protecting portions of the plant from environmental conditions and controlling the direction of plant growth.

3. A method according to claim 1 including severing the wire cage for customizing the cage for a specific plant size.

4. A method for using multiple wire structures as both greenhouses and supporting structures for plants comprising:

providing a plurality of wire cages, each cage centered about a vertical axis and having a first set of bendable legs extending from the top of the cage, and a second set of bendable legs extending from the bottom of the cage;

providing a plurality of covers, each cover sized to fit over one of the cages;

bending the first set of legs toward the vertical axis of the cage for enclosing the top of the cage, inserting the second set of legs into the ground to provide support for the cage;

covering the first set of legs and the cage with the cover so that the cover, legs, and cage operate as a greenhouse; and inverting the cage and inserting the first set of legs into the ground for using the cage as a support for plants.

5. A method according to claim 4 including interconnecting the cages together to provide an overall interconnected inter-structure with increased strength.

6. A method according to claim 5 wherein the cages are interconnected by wrapping the leg from at least one cage onto another cage.

* * * * *